United States Patent
McEwan (10) Patent No.: US 7,231,637 B1
(45) Date of Patent: Jun. 12, 2007

(54) SECURITY AND SOFTWARE TESTING OF PRE-RELEASE ANTI-VIRUS UPDATES ON CLIENT AND TRANSMITTING THE RESULTS TO THE SERVER

(75) Inventor: William Alexander McEwan, Newton Blossomville (GB)

(73) Assignee: McAfee, Inc., Santa Clara, CA (US)

( * ) Notice: Subject to any disclaimer, the term of this patent is extended or adjusted under 35 U.S.C. 154(b) by 1186 days.

(21) Appl. No.: 09/916,609

(22) Filed: Jul. 26, 2001

(51) Int. Cl.
 *G06F 9/445* (2006.01)
(52) U.S. Cl. .................................. 717/171; 713/201
(58) Field of Classification Search ........ 717/168–178, 717/124–127; 713/1, 2, 100, 170, 187–189, 713/191, 200, 201
See application file for complete search history.

(56) References Cited

U.S. PATENT DOCUMENTS

| | | | | |
|---|---|---|---|---|
| 4,456,788 A | * | 6/1984 | Kline et al. | 379/137 |
| 5,388,211 A | * | 2/1995 | Hornbuckle | 717/178 |
| 5,448,724 A | * | 9/1995 | Hayashi | 714/4 |
| 5,715,462 A | * | 2/1998 | Iwamoto et al. | 717/173 |
| 5,732,275 A | * | 3/1998 | Kullick et al. | 717/170 |
| 5,835,911 A | * | 11/1998 | Nakagawa et al. | 707/203 |
| 5,860,012 A | * | 1/1999 | Luu | 717/175 |
| 5,909,581 A | * | 6/1999 | Park | 717/170 |
| 5,919,247 A | * | 7/1999 | Van Hoff et al. | 709/217 |
| 5,919,257 A | * | 7/1999 | Trostle | 726/22 |
| 5,931,946 A | * | 8/1999 | Terada et al. | 726/25 |
| 5,991,881 A | * | 11/1999 | Conklin et al. | 726/22 |
| 6,006,034 A | * | 12/1999 | Heath et al. | 717/170 |
| 6,009,274 A | * | 12/1999 | Fletcher et al. | 717/173 |
| 6,052,531 A | * | 4/2000 | Waldin et al. | 717/170 |
| 6,064,821 A | * | 5/2000 | Shough et al. | 717/174 |
| 6,075,863 A | | 6/2000 | Krishnan et al. | 380/49 |
| 6,088,803 A | * | 7/2000 | Tso et al. | 713/201 |
| 6,138,153 A | * | 10/2000 | Collins et al. | 709/221 |
| 6,154,878 A | * | 11/2000 | Saboff | 717/173 |
| 6,161,218 A | * | 12/2000 | Taylor | 717/174 |
| 6,182,285 B1 | * | 1/2001 | Bleizeffer et al. | 717/170 |

(Continued)

FOREIGN PATENT DOCUMENTS

WO WO 9810342 A2 * 3/1998

(Continued)

OTHER PUBLICATIONS

Norton AntiVirus for Macintosh Reference Guide, Norton AntiVirus 7.0, pp. 41-50, 2000.*

(Continued)

*Primary Examiner*—Todd Ingberg
(74) *Attorney, Agent, or Firm*—Zilka-Kotab, PC; Christopher J. Hamaty (57) ABSTRACT

A system, method and computer program product for testing scanner updates. Initially, a full-release scanner update is distributed from a server to a plurality of computers utilizing a network. A pre-release scanner update is also distributed from the server to the computers utilizing the network. The full-release scanner update is executed on the computers for security scanning. Further, the pre-release scanner update is executed on the computers for testing purposes. Results of the testing are transmitted from the computers to the server utilizing the network.

34 Claims, 6 Drawing Sheets

U.S. PATENT DOCUMENTS

| | | | |
|---|---|---|---|
| 6,324,692 B1 * | 11/2001 | Fiske | 717/171 |
| 6,338,149 B1 * | 1/2002 | Ciccone et al. | 714/38 |
| 6,347,398 B1 * | 2/2002 | Parthasarathy et al. | 717/178 |
| 6,363,499 B1 * | 3/2002 | Delo et al. | 714/15 |
| 6,438,749 B1 * | 8/2002 | Chamberlain | 717/174 |
| 6,484,315 B1 * | 11/2002 | Ziese | 717/173 |
| 6,493,871 B1 * | 12/2002 | McGuire et al. | 717/173 |
| 6,591,358 B2 * | 7/2003 | Jaffrey | 712/32 |
| 6,651,249 B2 * | 11/2003 | Waldin et al. | 717/170 |
| 6,826,715 B1 * | 11/2004 | Meyer et al. | 714/37 |
| 6,854,016 B1 * | 2/2005 | Kraenzel et al. | 709/229 |

FOREIGN PATENT DOCUMENTS

| | | |
|---|---|---|
| WO | WO 9926161 A1 * | 5/1999 |

OTHER PUBLICATIONS

Norton AntiVirus Symantec, Windows 95 User's Guide, 1995, Chapters 1-11, Appendicies.*

Norton AntiVirus 2000, Version 6.0 Semantec Corp, User's Guide, 1998, pp. 1-67, German No Translation.*

Norton AntiVirus Corporation Edition 7.0 Symantec Inc, 1999, pp. 1-44.*

Norton AntiVirus Corporate Edition User's Gude 7.5, Symantec Inc. Oct. 30, 2000, pp. 1-38.*

News Release Norton AntiVirus Corporate Edition 7.0 Automatically Protects Corporations Against Malicious Virus Attacks, Sep. 14, 1999, 2 pages.*

Symantec Announces New Version of Norton Utilites and Norton Antivirus for Macintosh, 3 pages, Oct. 25, 2000.*

Norton Ghost For Netware Reduces Total Cost of Ownership on Netware Servers, 2 pages Dec. 13, 1999.*

Norton Antivirus 7.0 for Macintosh Reference Guide, pp. 1-133, 2000.*

MCAfee, McAfee Office Pro 2000 Pro User's Guide, pp. 1-264, 1999.*

Symantec, The Norton AntiVirus For Netware, Version 2, User's Gudie, 1996, 1 page of manual.*

* cited by examiner

SECURITY AND SOFTWARE TESTING OF PRE-RELEASE ANTI-VIRUS UPDATES ON CLIENT AND TRANSMITTING THE RESULTS TO THE SERVER

FIELD OF THE INVENTION

The present invention relates to virus scanning methods, and more particularly to distributing scanning updates for scanning data for viruses and/or harmful content.

BACKGROUND OF THE INVENTION

The generation and spread of computer viruses is a major problem in modern day computing. Generally, a computer virus is a program that is capable of attaching to other programs or sets of computer instructions, replicating itself, and performing unsolicited or malicious actions on a computer system. Generally, computer viruses are designed to spread by attaching to floppy disks or data transmissions between computer users, and are designed to do damage while remaining undetected. The damage done by computer viruses may range from mild interference with a program, such as the display of an unwanted political message in a dialog box, to the complete destruction of data on a user's hard drive. It is estimated that new viruses are created at a rate of over 100 per month.

A variety of programs have been developed to detect and destroy computer viruses. As is known in the art, a common method of detecting viruses is to use a virus scanning engine to scan for known computer viruses in executable files, application macro files, disk boot sectors, etc. Generally, computer viruses are comprised of binary sequences called "virus signatures." Upon the detection or a virus signature by the virus scanning engine, a virus disinfection program may then be used to extract the harmful information from the infected code, thereby disinfecting that code. Common virus scanning software allows for boot-sector scanning upon system bootup, on-demand scanning at the explicit request of the user, and/or on-access scanning of a file when that file is accessed by the operating system or an application.

In order to detect computer viruses, a virus scanning engine is generally provided in conjunction with one or more files called "virus signature files". The virus scanning engine scans a user's computer files via a serial comparison of each file against the virus signature files. Importantly, if the signature of a certain virus is not contained in any of the virus signature files, that virus will not be detected by the virus scanning engine.

Generally speaking, a recent trend is for manufacturers of antivirus applications to update their virus signature files as new viruses are discovered and as cures for these viruses are developed, and to make these updated signature files available to users on a periodic basis (e.g. monthly, quarterly, etc.). For example, an antivirus program manufacturer may post the update file on a bulletin board system, on an FTP (File Transfer Protocol) site, or on a World Wide Web site for downloading by users.

Updates to antivirus applications often must be developed and tested in short time cycles so that customers can be protected for new virus threats. Antivirus applications also must operate as part of an operating system, so the quality of antivirus applications must be high to prevent system failure.

As a result of the rapid nature of development of antivirus application updates, and the wide scale distribution via the Internet, current-testing procedures do not always ensure stability. Unfortunately, various problems can occur when antivirus applications or signature files are updated, i.e. system hangs, system crashes and false alarms (i.e. detecting viruses when no virus exists).

DISCLOSURE OF THE INVENTION

A system, method and computer program product are provided for testing scanner updates. Initially, a full-release scanner update is distributed from a server to a plurality of computers utilizing a network. A pre-release scanner update is also distributed from the server to the computers utilizing the network. The full-release scanner update is executed on the computers for security scanning. Further, the pre-release scanner update is executed on the computers for testing purposes. Results of the testing are transmitted from the computers to the server utilizing the network.

In one embodiment, the full-release scanner update and the pre-release scanner update may be distributed simultaneously. Further, the full-release scanner update and the pre-release scanner update may be distributed together. As an option, the pre-release scanner update may be distributed with virus signature updates. Still yet, the pre-release scanner update may be distributed on a periodic basis. In use, it may be determined whether a pre-release scanner update exists, and the pre-release scanner update may be conditionally distributed from the server if the pre-release scanner update exists. Optionally, the pre-release scanner update may be executed when the computers are idle.

In another embodiment, the results of the testing are transmitted to a quality assurance administrator via the Internet. Further, results of the execution of the full-release scanner update and the pre-release scanner update may be compared. It should be noted that the comparison may occur on the computers. In such case, the results of the comparison are transmitted from the computers to the server utilizing the network. In the alternative, the comparison may be performed by the quality assurance administrator.

In still another embodiment, it may be determined whether a virus is detected by the execution of the pre-release scanner update and not the full-release scanner update based on the comparison. Such virus may be removed, and an associated record of the virus may be stored. The virus may also be reported.

In a similar manner, faults associated with the execution of the pre-release scanner update may be detected. A record of such faults may be transmitted from the computers to the server utilizing the network. Further, the execution of the pre-release scanner update on the computers may be ceased in response to the detection of the faults. Thereafter, the pre-release scanner update may be re-executed on the computers after ceasing the execution. A number of the faults may be counted such that the pre-release scanner update may be conditionally re-executed on the computers based on the number.

In still yet another embodiment, a duration of the execution of the pre-release scanner update may be monitored. Further, a record of the duration may be transmitted from the computers to the server utilizing the network.

By this design, the results of executing one or more pre-release scanner updates may be used to modify the pre-release scanner update before releasing the pre-release scanner update as a full-release scanner update.

DESCRIPTION OF THE PREFERRED EMBODIMENTS

Figure 1:
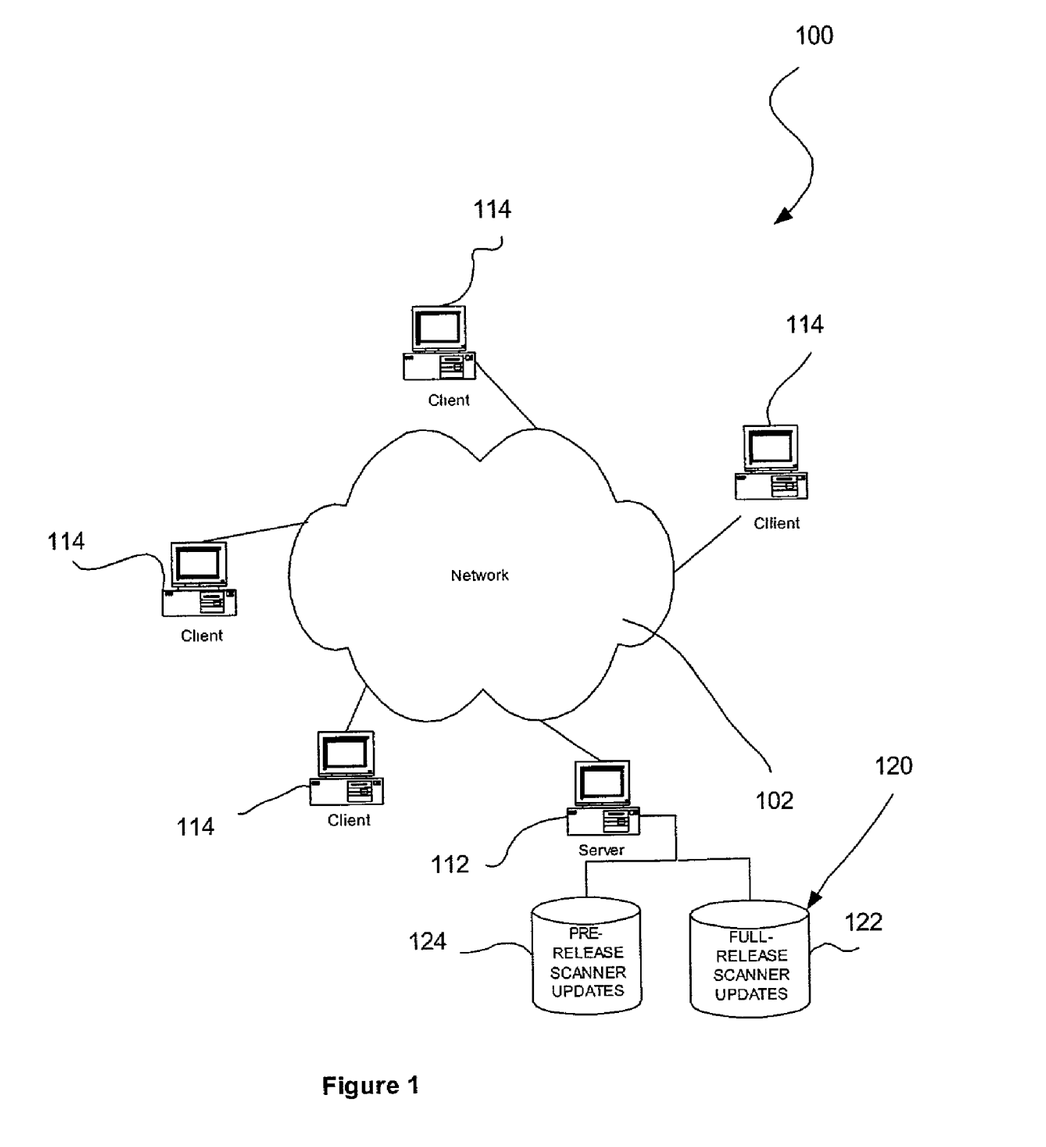
FIG. 1 illustrates a network architecture, in accordance with one embodiment.

FIG. 1 illustrates a network architecture 100, in accordance with one embodiment. As shown, a remote server 112 is provided which is coupled to a network 102. In the context of the present network architecture 100, the network 102 may take any form including, but not limited to a local area network (LAN), a wide area network (WAN) such as the Internet, etc. It should be noted that various other networks 102 may also be included.

Also provided is at least one target computer 114 coupled to the network 102. Such target computers 114 may include a web server, desktop computer, lap-top computer, hand-held computer, printer or any other type of hardware/software. For reasons that will soon become apparent, each of the target computers 114 may include a scanner for performing virus and/or content scanning. In particular, each scanner may serve to scan the target computer 114 for malicious programs such as viruses, worms, and Trojan horses. Further, each scanner may serve to filter content at the associated target computer 114 to enforce operational policies [i.e. detecting harassing or pornographic content, junk e-mails, misinformation (virus hoaxes), etc.].

The remote source 112 includes a plurality of scanner update databases 120. In the context of the present description, a scanner update in the scanner update databases 120 may include virus signatures, rule sets, or any other component of the scanners on the target computers 114 which may be updated for improvement purposes. Accordingly, the scanner updates may be used for virus, content or another type of scanning.

The scanner update databases 120 include a full-release scanner update database 122 and a pre-release scanner update database 124. The full-release scanner update database 122 includes a plurality of full-release scanner updates that are tested and ready for distribution to the target computers 114 for updating the scanners thereon. On the other hand, the pre-release scanner update database 124 includes pre-release scanner updates which are not necessarily fully tested and ready for distribution. In the context of the present description, the pre-release scanner updates may include any scanner updates less ready for distribution with respect to the full-release scanner updates.

Figure 2:
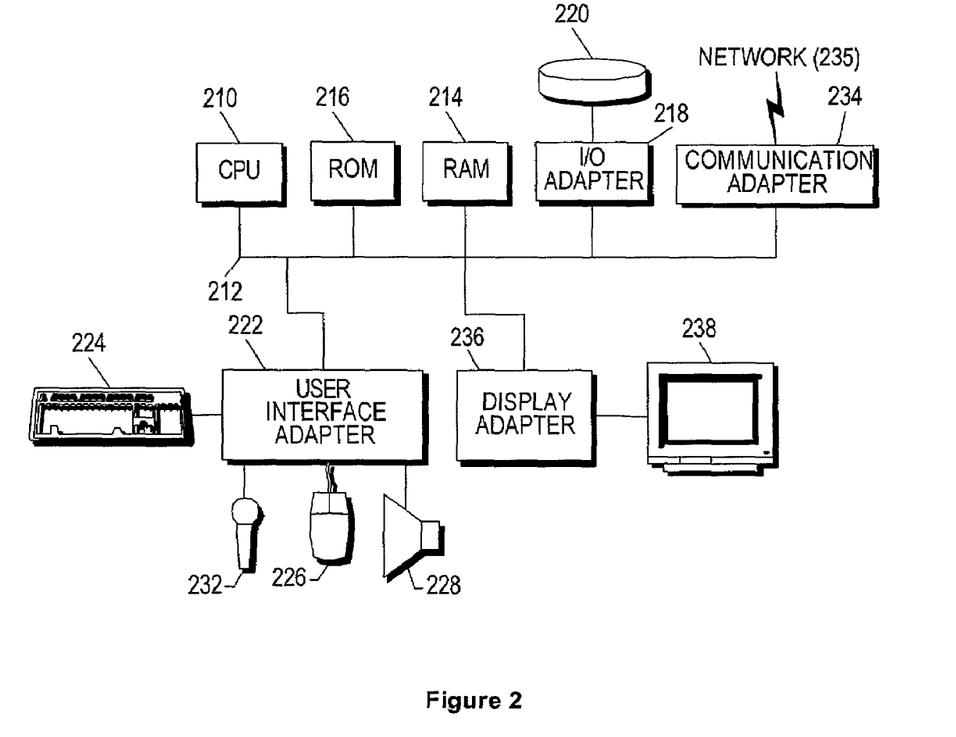
FIG. 2 shows a representative hardware environment that may be associated with the remote server and/or target computers of FIG. 1, in accordance with one embodiment.

FIG. 2 shows a representative hardware environment that may be associated with the remote server 112 and/or target computers 114 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
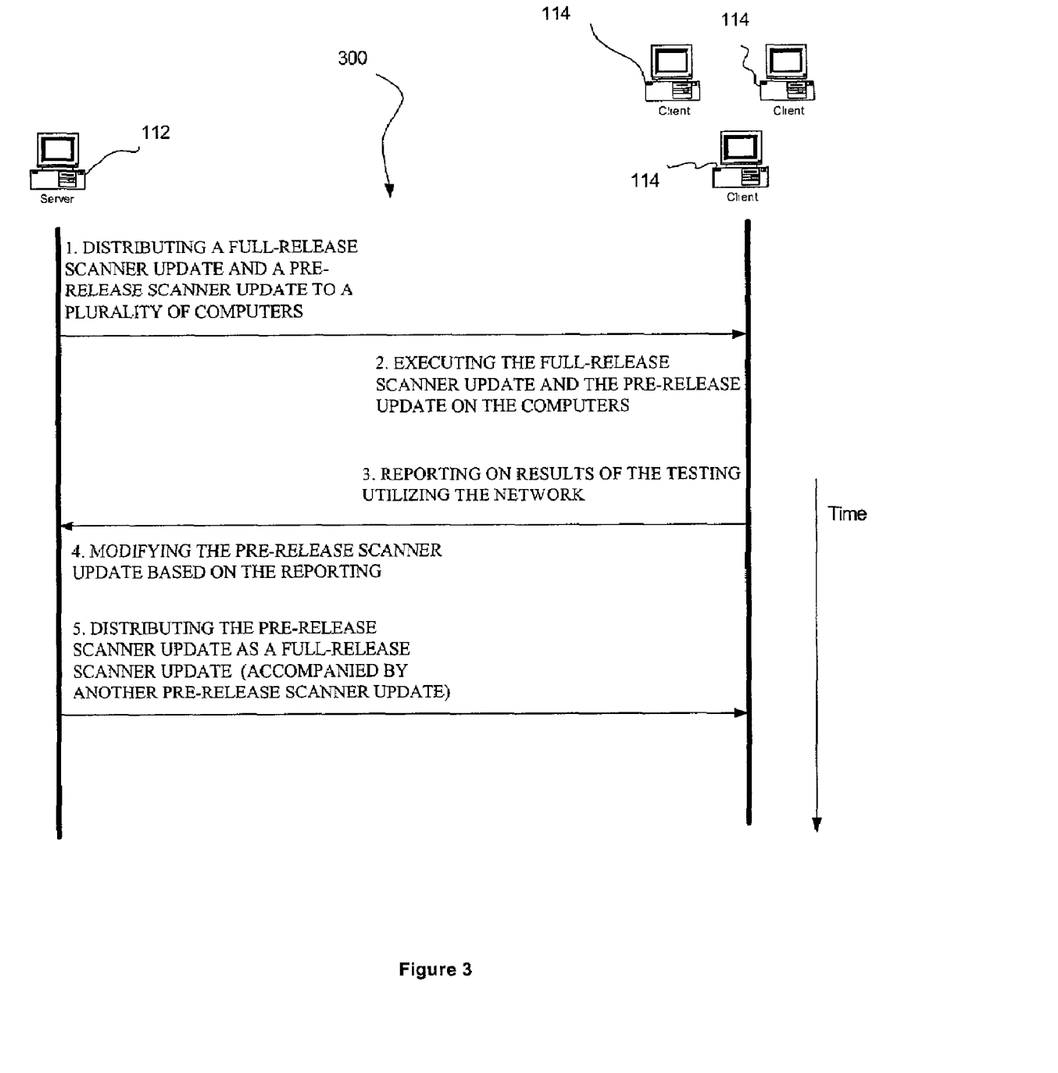
FIG. 3 illustrates an overview of a method for testing scanner updates, in accordance with one embodiment.

FIG. 3 illustrates an overview of a method 300 for testing scanner updates, in accordance with one embodiment. Initially, in operation 1, a full-release scanner update from the full-release scanner update database 120 is distributed from the server 112 to a plurality of computers 114 utilizing the network 102. As shown, a pre-release scanner update from the pre-release scanner update database 124 is also distributed from the server 112 to the computers 114.

Next, in operation 2, the full-release scanner update is executed on the computers 114 for security scanning. Further, the pre-release scanner update is executed on the computers 114 for testing purposes.

As shown in operation 3, results of the testing are transmitted from the computers 114 to the server 112 utilizing the network 102. By this design, the results of one or more pre-release scanner updates may be used by a quality assurance administrator to modify the pre-release scanner update before releasing the pre-release scanner update as a full-release scanner update. See operations 4 and 5 of FIG. 3.

Figure 4:
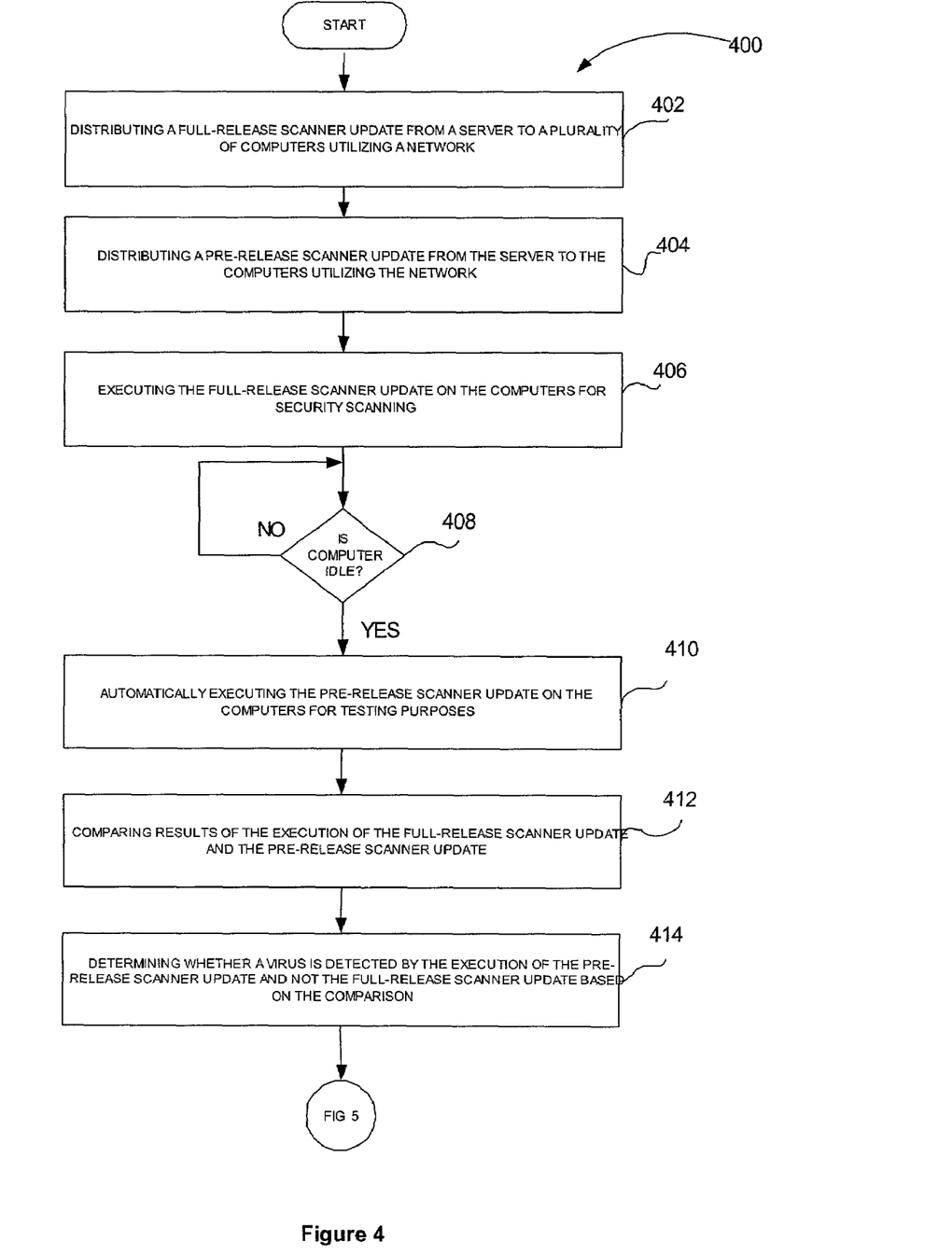
FIGS. 4 through 6 illustrate a method for testing scanner updates, in accordance with another embodiment.
Figure 5:
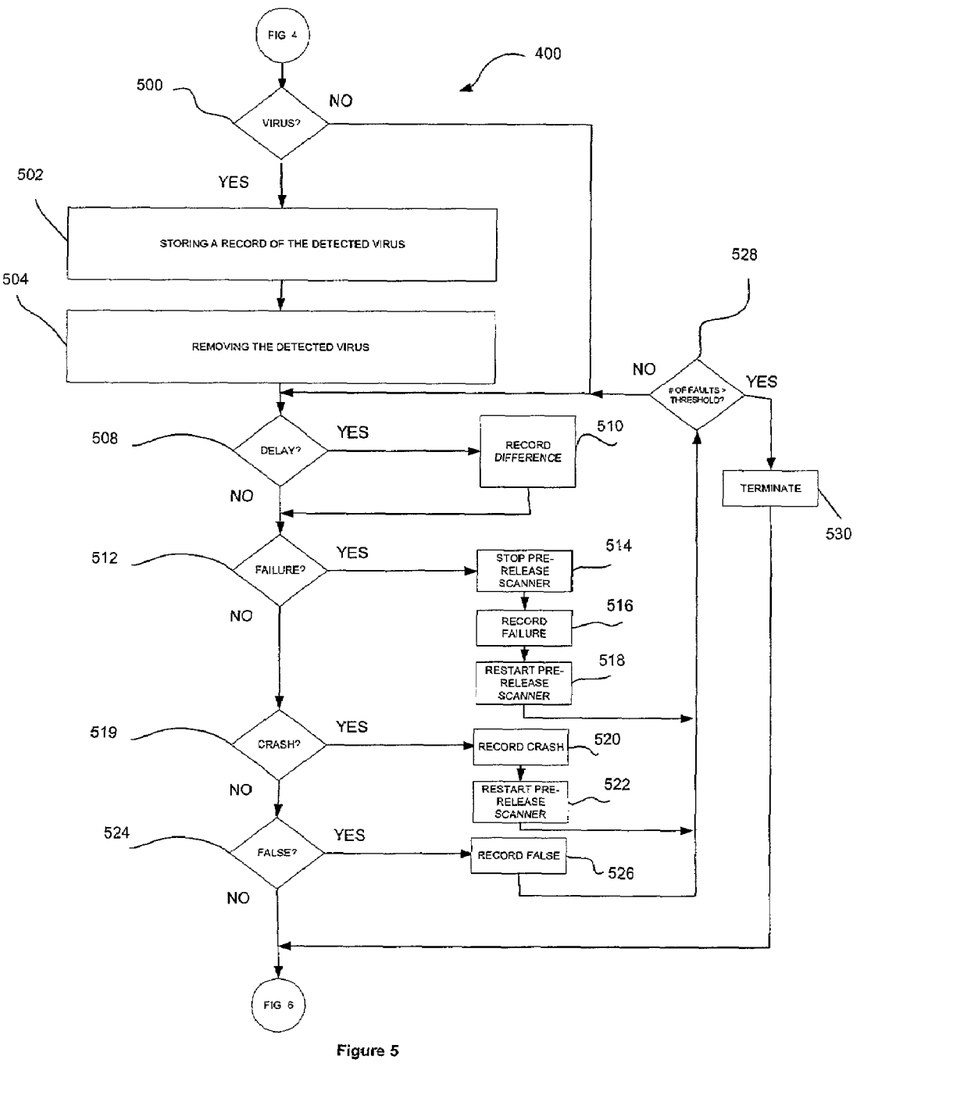
Figure 6:
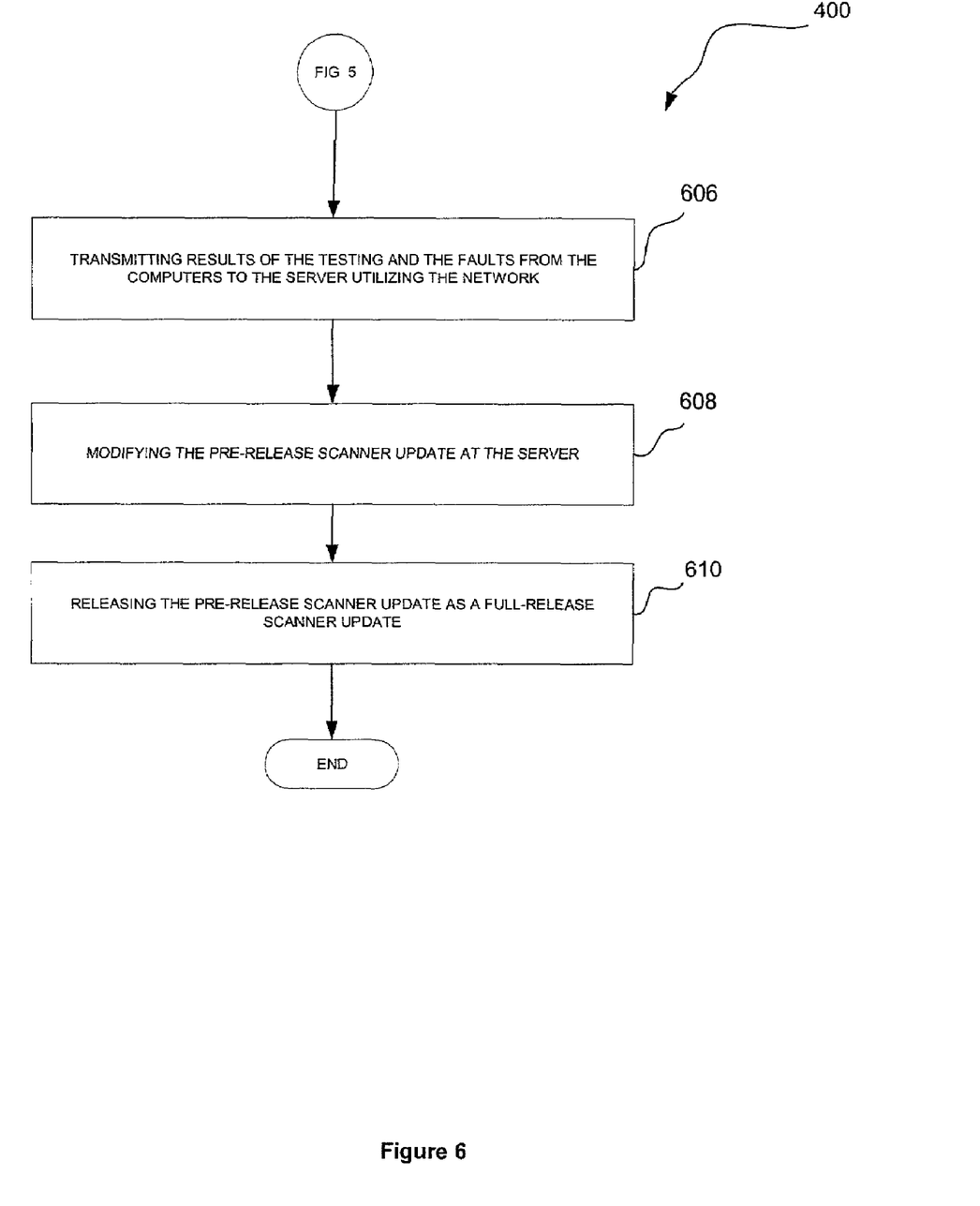

FIGS. 4 through 6 illustrate a method 400 for testing scanner updates, in accordance with another embodiment. As mentioned hereinabove, a full-release scanner update database 120 is distributed from the server 112 to a plurality of computers 114 utilizing the network 102. Note operation 402. Further, in operation 404, a pre-release scanner update from the pre-release scanner update database 124 is also distributed from the server 112 to the computers 114. When distributed, the full-release scanner update replaces an old update, and the pre-release scanner update is stored on the computers 114 for testing in a manner that will soon be set forth.

In one embodiment, the full-release scanner update and the pre-release scanner update may be distributed simultaneously. Further, the full-release scanner update and the pre-release scanner update may be distributed together in the same file and/or data transmission. Still yet, the scanner updates may be distributed on a periodic basis, i.e. daily, weekly, monthly, etc.

As an option, the pre-release scanner update may be conditionally distributed from the server 112 based on whether the pre-release scanner update exists. For example, it may be determined whether a pre-release scanner update exists, and the pre-release scanner update may be conditionally distributed from the server 112 if the pre-release scanner update exists. In such embodiment, the pre-release scanner update may be distributed with the full-release scanner update based on some predetermined development schedule.

In operation 406, the full-release scanner update is executed with the scanner on the computers 114 for conventional security scanning. Results of the execution of the full-release scanner update are stored for analysis at a later time.

It is then determined whether a particular computer 114 is idle in decision 408. In the context of the present description, the computer 114 may be considered idle when more than a predetermined amount of resources is available. As an option, the computer 114 may be considered idle when a user is not using the computer 114, or no applications are currently being executed.

Once the computer is considered idle, the pre-release scanner update is executed with the scanner on the computer 114 for testing the pre-release scanner update. Note operation 410. It should be noted that the operations associated with the full-release scanner update are recorded in a queued so that, during idle time, the pre-release scanner update may run the same operations as performed by the full-release scanner update for comparison of the results.

Results of the execution of the pre-release scanner update and the full-release scanner update are then compared in operation 412. It should be noted that the comparison may occur on the computers 114. In the alternative, the comparison may be performed by the quality assurance administrator at the server 112.

In particular, it may be determined whether a virus is detected by the execution of the pre-release scanner update and not the full-release scanner update based on the comparison. Note operation 414. If a virus is detected by the pre-release scanner update which was not detected by the full-release update, it is possible that such detection is a false alarm. A test for such situation may be carried out, as will soon become apparent.

With reference now to FIG. 5, it is shown that it is determined in decision 500 whether the virus is detected. If it is, the virus is removed in operation 502 using any well known repair routine. Further, an associated record of the virus may be stored at the computer 114 in operation 504. Such record may include a virus signature, time of detection, or any other identifying information.

A duration of the execution of the pre-release scanner update is monitored during execution. If a delay in such execution exceeds a predetermined amount, as determined in decision 508, a record of the duration may be stored at the computer 114 in operation 510. In one embodiment, decision 508 may gauge the delay based on whether the time taken to scan is proportionally longer with respect to the full-release scanner update, or, in other words, the pre-release scanner update is considerably slower. As an option, a certain percentage range (i.e. 110%-X %) of increased delay may trigger decision 508. Further, the record of duration may be in terms of a difference with respect to the execution of the full-release scanner update.

Next, in decision 512, the execution of the pre-release scanner update on the computer 114 is monitored for a failure to complete a designated scan. Such event may be triggered upon the execution of the pre-release scanner update exceeding the percentage range mentioned hereinabove. In response to such unacceptable delay, the execution of the pre-release scanner update may be ceased in operation 514. Further, the failure may be recorded in operation 516, and the pre-release scanner update re-executed in operation 518.

In a similar manner, crashes associated with the execution of the pre-release scanner update may be detected in decision 519. In one embodiment, a crash may refer to any instance where an error is returned, or any other indication that the pre-release scanner update or computer 114 has stopped working. If detected, the crash of the pre-release scanner update on the computer 114 may be recorded. See operation 520. Thereafter, the pre-release scanner update may be re-executed in operation 522.

As mentioned earlier during reference to operation 414, if a virus is detected by the pre-release scanner update which was not detected by the full-release update, it is possible that such detection is a false alarm. A test for such situation may be carried out in decision 524. This may be accomplished by any well known analysis of viruses and the legitimacy thereof. If the virus detection is determined to be a false alarm, a record of such is stored in operation 526.

For reasons that will soon become apparent, a number of the foregoing instances of faults (i.e. delays, failures, crashes, false alarms, etc.) may be counted for determining whether the number of such instances exceed a predetermined amount. Note decision 528. In one embodiment, the predetermined amount may refer to a predetermined number of instances in a certain timeframe. Such criteria may be set to prevent the computer 114 from stalling beyond a predetermined threshold. If such predetermined amount is not yet reached, the pre-release scanner update may be continuously executed and re-executed on the computer 114. If, however, such predetermined amount has been reached, the pre-release scanner update may be terminated in operation 530.

Next, the method 400 is continued by transmitting results to the server 112 in operation 606 of FIG. 6. Ideally, a record of such viruses, failures, crashes, false alarms and delays found are transmitted from the computers to the server utilizing the network.

By this design, the results of one or more pre-release scanner updates may be used by a quality assurance administrator to modify the pre-release scanner update in operation 608. Specifically, the pre-release scanner update may be modified to prevent the faults before releasing the pre-release scanner update as a full-release scanner update in operation 610.

The present embodiment thus provides a distributed testing framework that can be created as part of the scanning software product which allows for transparent testing of pre-release updates. This may be done at idle time on computers 114 by using redundancy checking against a currently full-release update. To this end, the present testing framework provides a safe process in which pre-release updates can be tested automatically without affecting the computers 114.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for testing scanner updates executing on a computer including computer readable medium, comprising:
    (a) distributing a full-release scanner update from a server to a plurality of computers utilizing a network;
    (b) distributing a pre-release scanner update from the server to the computers utilizing the network;
    (c) executing the full-release scanner update on the computers for security scanning;
    (d) executing the pre-release scanner update on the computers for testing purposes;

(e) transmitting results of the testing from the computers to the server utilizing the network; and (f) utilizing the results to modify the pre-release scanner update before releasing the pre-release scanner update as a full-release scanner update.

2. The method as recited in claim 1, wherein the full-release scanner update and the pre-release scanner update are distributed simultaneously.

3. The method as recited in claim 1, wherein the full-release scanner update and the pre-release scanner update are distributed together.

4. The method as recited in claim 1, wherein the pre-release scanner update is distributed on a periodic basis.

5. The method as recited in claim 1, wherein the pre-release scanner update is distributed with virus signatures.

6. The method as recited in claim 1, and further comprising automatically determining whether a pre-release scanner update exists, and conditionally distributing the pre-release scanner update from the server if the pre-release scanner update exists.

7. The method as recited in claim 1, wherein the pre-release scanner update is executed when the computers are idle.

8. The method as recited in claim 1, wherein the pre-release scanner update is executed automatically when the computers are idle.

9. The method as recited in claim 1, wherein the results are transmitted to a quality assurance administrator.

10. The method as recited in claim 1, and further comprising comparing results of the execution of the full-release scanner update and the pre-release scanner update.

11. The method as recited in claim 10, wherein the comparison occurs on the computers.

12. The method as recited in claim 11, and further comprising transmitting results of the comparison from the computers to the server utilizing the network.

13. The method as recited in claim 10, and further comprising determining whether a virus is detected by the execution of the pre-release scanner update and not the full-release scanner update based on the comparison.

14. The method as recited in claim 13, and further comprising removing the virus.

15. The method as recited in claim 13, and further comprising storing a record of the virus.

16. The method as recited in claim 13, and further comprising reporting the virus.

17. The method as recited in claim 1, wherein the network includes the Internet.

18. The method as recited in claim 1, and further comprising detecting faults associated with the execution of the pre-release scanner update.

19. The method as recited in claim 18, and further comprising transmitting a record of the faults from the computers to the server utilizing the network.

20. The method as recited in claim 18, and further comprising ceasing the execution of the pre-release scanner update on the computers in response to the detection of the faults.

21. The method as recited in claim 20, and further comprising re-executing the pre-release scanner update on the computers after ceasing the execution.

22. The method as recited in claim 18, and further comprising counting a number of the faults, and conditionally terminating the pre-release scanner update on the computers based on the number.

23. The method as recited in claim 22, wherein the faults include at least one of delays, failures, crashes, and false alarms.

24. The method as recited in claim 1, and further comprising detecting a duration of the execution of the pre-release scanner update.

25. The method as recited in claim 24, and further comprising transmitting a record of the duration from the computers to the server utilizing the network.

26. The method as recited in claim 1, further comprising recording operations of the full-release scanner update during the execution of the full-release scanner update.

27. The method as recited in claim 26, wherein the recorded operations are performed by the pre-release scanner update during the execution of the pre-release scanner update.

28. The method as recited in claim 26, wherein the operations are recorded in a queue.

29. The method as recited in claim 26, wherein results of the operations during the execution of the full-release scanner update and the pre-release scanner update are compared.

30. A computer program product for testing scanner updates, comprising:
(a) computer code for distributing a full-release scanner update from a server to a plurality of computers utilizing a network;
(b) computer code for distributing a pre-release scanner update from the server to the computers utilizing the network;
(c) computer code for executing the full-release scanner update on the computers for security scanning;
(d) computer code for executing the pre-release scanner update on the computers for testing purposes; and
(e) computer code for transmitting results of the testing from the computers to the server utilizing the network;
(f) wherein a result of code execution is stored on a computer readable medium.

31. A system for testing scanner updates, comprising:
(a) logic for distributing a full-release scanner update from a server to a plurality of computers utilizing a network;
(b) logic for distributing a pre-release scanner update from the server to the computers utilizing the network;
(c) logic for executing the full-release scanner update on the computers for security scanning;
(d) logic for executing the pre-release scanner update on the computers for testing purposes; and
(e) logic for transmitting results of the testing from the computers to the server utilizing the network;
(f) wherein a result of system execution is stored on a computer readable medium.

32. A server-based method for testing scanner updates executing on a computer including computer readable medium, comprising:
(a) distributing a full-release scanner update from a server to a plurality of computers utilizing a network;
(b) distributing a pre-release scanner update from the server to the computers utilizing the network;
(c) receiving results of the execution of the full-release scanner update and the pre-release scanner update from the computers;
(d) modifying the pre-release scanner update before releasing the pre-release scanner update as a full-release scanner update based on the results.

33. A client-based method for testing scanner updates executing on a computer including computer readable medium, comprising:

(a) receiving from a server a full-release scanner update at a computer utilizing a network;
(b) receiving from the server a pre-release scanner update at the computer utilizing the network;
(c) executing the full-release scanner update on the computer for security scanning;
(d) executing the pre-release scanner update on the computer for testing purposes;
(e) transmitting results of the testing from the computer to the server utilizing the network; and
(f) utilizing the results to modify the pre-release scanner update before releasing the pre-release scanner update as a full-release scanner update.

34. A method for testing scanner updates executing on a computer including computer readable medium, comprising:
(a) distributing a full-release scanner update from a server to a plurality of computers utilizing a network;
(b) distributing a pre-release scanner update from the server to the computers simultaneously with the full-release update utilizing the network;
(c) executing the full-release scanner update on the computers for security scanning;
(d) determining whether the computers are idle;
(e) automatically executing the pre-release scanner update on the computers for testing purposes upon the computers being determined to be idle;
(f) comparing results of the execution of the full-release scanner update and the pre-release scanner update;
(g) determining whether a virus is detected by the execution of the pre-release scanner update and not by the full-release scanner update based on the comparison;
(h) storing a record of the detected virus;
(i) removing the detected virus;
(j) detecting faults associated with the execution of the pre-release scanner update;
(k) ceasing the execution of the pre-release scanner update on the computers in response to the detection of at least one fault;
(l) re-executing the pre-release scanner update on the computers after ceasing the execution;
(m) counting a number of the faults;
(n) conditionally re-executing the pre-release scanner update on the computers if the number exceeds a predetermined number within a predetermined amount of time;
(o) storing a record of the faults;
(p) transmitting results relating to the viruses and faults from the computers to the server utilizing the network; and
(q) modifying the pre-release scanner update at the server before releasing the pre-release scanner update as a full-release scanner update based on the results.

* * * * *